US008588470B2

(12) United States Patent
Rodriguez Serrano et al.

(10) Patent No.: US 8,588,470 B2
(45) Date of Patent: Nov. 19, 2013

(54) METHODS AND SYSTEMS FOR IMPROVED LICENSE PLATE SIGNATURE MATCHING BY SIMILARITY LEARNING ON SYNTHETIC IMAGES

(75) Inventors: Jose Antonio Rodriguez Serrano, Grenoble (FR); Raja Bala, Pittsford, NY (US); Florent Perronnin, Domene (FR); Craig John Saunders, Grenoble (FR); Yonghui Zhao, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 199 days.

(21) Appl. No.: 13/300,124

(22) Filed: Nov. 18, 2011

(65) Prior Publication Data

US 2013/0129151 A1 May 23, 2013

(51) Int. Cl.
*G06K 9/00* (2006.01)
(52) U.S. Cl.
USPC ........................................................ 382/105
(58) Field of Classification Search
None
See application file for complete search history.

(56) References Cited

U.S. PATENT DOCUMENTS

| | | | | |
|---|---|---|---|---|
| 6,433,706 | B1 * | 8/2002 | Anderson et al. ............ | 340/937 |
| 2009/0180695 | A1 * | 7/2009 | Rodriguez Serrano et al. ............................ | 382/186 |

OTHER PUBLICATIONS

Shyang-Lih Chang; Li-Shien Chen; Yun-Chung Chung; and Sei-Wan Chen, "Automatic License Plate Recognition", Mar. 2004, IEEE Transaction on Intelligent Transportation System, vol. 5, No. 1.*

Jose A. Rodriguez-Serrano; Harsimrat Sandhawalia; Raja Bala; Florent Perronnin; and Craig Saunders, "Data-Driven Vehicle Identification by Image Matching", 2012, Springer-Verlag Berlin Heidelberg, pp. 536-545.*
Raja Bala; Yonghui Zhao; Aaron Burry; Vladimir Kozitsky; Claud Fillion; Craig Saunders; and Jose Rodriguez-Serrano, "Image Simulation for Automatic License Plate Recognition", 2012, Proc. of SPIE-IS&T Electronic Imaging vol. 8305,83050Z1-9.*
Kate Saenko et al., "Adapting Visual Category Models to New Domains," ECCV 2010, pp. 1-14.
Daniel Keysers et al., "Deformation Models for Image Recognition," IEEE Transactions on Pattern Analysis and Machine Intelligence, vol. 29, No. 8, Aug. 2007, pp. 1422-1435.
Kilian Q. Weinberger et al., "Distance Metric Learning for Large Margin Nearest Neighbor Classification," Journal Machine Learning Research 10 (2009), pp. 207-244.
Jose A. Rodriguez-Serrano et al., "Handwritten word-image retrieval with synthesized typed queries," 2009 10th International Conference on Document Analysis and Recognition, pp. 351-355.
Jason V. Davis et al., "Information-Theoretic Metric Learning," 24th International Conference of Machine Learning, Corvallis, OR, 2007.

(Continued)

*Primary Examiner* — Samir Ahmed
*Assistant Examiner* — Siamak Harandi
(74) *Attorney, Agent, or Firm* — MH2 Technology Law Group LLP

(57) ABSTRACT

Methods and systems for improved license plate signature matching by similarity learning on synthetic images comprise generating a plurality of synthetic license plate images; applying one or more transformations to the synthetic license plate images to cause the synthetic license plate images to more closely resemble authentic license plate image captures; and providing the synthetic license plate images as inputs to a machine distance learning algorithm in which weighted similarity scores are calculated between signatures of analogous and non-analogous license plate images and one or more sets of signature weights are iteratively adjusted to increase the likelihood that comparing analogous license plate images results in high weighted signature similarity scores and comparing non-analogous license plate images results in low weighted signature similarity scores.

25 Claims, 11 Drawing Sheets
(4 of 11 Drawing Sheet(s) Filed in Color)

(56) References Cited

OTHER PUBLICATIONS

T. Konidaris et al., "Keyword-guided word spotting in historical printed documents using synthetic data and user feedback," International Journal on Document Analysis and Recognition, 9(2-4), pp. 167-177, 2007.

Javier Marin, et al., "Learning Appearance in Virtual Scenarios for Pedestrian Detection," CVPR 2010.

Roberto Paredes et al., "Learning weighted metrics to minimize nearest-neighbor classification error," IEEE Trans. on PAMI, 2006.

Brian McFee et al., "Metric Learning to Rank," 27th International Conference on Machine Learning, Haifa, Israel, 2010.

Bing Bai et al., "Supervised Semantic Indexing," CIKM 2009.

Johannes Sends et al., "Synthetically trained multi-view object class and viewpoint detection for advanced image retrieval," ICMR 2011, Apr. 17-20, Trento, Italy.

Raman Jain et al., "Towards More Effective Distance Functions for Word Image Matching," DAS 2010, Jun. 9-11, 2010, Boston, MA, USA.

Brian Kulis et al., "What You Saw is Not What You Get: Domain Adaptation Using Asymmetric Kernel Transforms," CVPR 2011.

Florent Perronnin et al., "Improving the Fisher Kernel for Large-Scale Image Classification," ECCV 2010, Part IV, LNCS 6314, pp. 143-156, 2010.

Florent Perronnin et al., "Fisher Kernels on Visual Vocabularies for Image Categorization," CVPR 2007.

* cited by examiner

460

462

470

472

480

482

490

492

METHODS AND SYSTEMS FOR IMPROVED LICENSE PLATE SIGNATURE MATCHING BY SIMILARITY LEARNING ON SYNTHETIC IMAGES

TECHNICAL FIELD

The present disclosure relates generally to methods and systems for improving automatic license plate recognition.

BACKGROUND

In traffic management and law enforcement, it is frequently necessary to identify individual vehicles using image captures from video and still frame cameras. Because license plate numbers, when combined with relevant issuing authorities, such as states or government agencies, are typically unique, license plates are a good way to uniquely identify vehicles from captured images. The process of automatically determining license plate information, such as license plate numbers, from captured images of license plates is known as automatic license plate recognition (ALPR).

Traditionally, ALPR has relied on optical character recognition (OCR) technology to determine license plate information from digital images. OCR typically operates by isolating individual characters in an image according to color and contrast differentials and then comparing individual scanned character shapes to pre-stored shapes or dimension-based algorithms associated with particular American Standard Code for Information Interchange (ASCII) or Unicode characters. Thus, the accuracy of an OCR process often depends greatly on the resolution and quality of the image on which it operates. In some implementations, if an OCR system is not able to match a particular scanned character to a known character with sufficient confidence, the OCR system may further make assumptions about the scanned character based on letter patterns associated with particular spelling or grammar rules.

Unfortunately, for ALPR systems, OCR presents a number of significant drawbacks. Often, images that are captured of license plates have numerous defects that may make it difficult for OCR to accurately decipher characters. Such defects may be caused by differing levels of lighting on a license plate due to differing times of day or weather conditions; blur resulting from fast moving vehicles; rust, deformation, or other physical defects in license plates; reduced contrast due to image captures based on infrared light; etc. Moreover, unlike character sequences representing words or phrases, license plate character sequences are typically random, such that OCR systems may not be able to increase certainty in deciphering characters based on their relationships to adjacent characters. And, while a certain degree of error may be tolerable for some OCR applications, such as an occasionally misspelled word resulting from an OCR processing of a document, even a single incorrect character may render an OCR result useless in the ALPR context, in which a vehicle is often uniquely identifiable by only a single license plate character sequence.

Given these shortcomings in using traditional OCR processes in ALPR, recent attention has been given to the idea of using image signature-based matching techniques to identify vehicle license plates. Signature-based image matching differs from OCR in several respects. Most importantly, whereas OCR operates by attempting to isolate and interpret each individual character within a larger image, signature-based image matching works by considering graphical characteristics of the image as a whole and distilling those characteristics into a more succinct signature, often represented as a vector. Two images may then be compared by evaluating the similarity of their signatures, for example using a vector dot product computation, even if individual characters cannot be discerned from one or both images using conventional OCR techniques.

Signature matching thus approximates image matching by representing portions or characteristics of images as compact binary or alphanumeric strings, which may be more easily compared than large numbers of pixels and also more distinct than image pixels. If image signatures are further represented as vectors, the dot product may allow a measure of similarity between two signature strings to be computed, even if they do not match completely. However, just as not all portions or characteristics of an image may be equally important when comparing two images for similarity, not all elements of a given signature, which elements represent portions or characteristics of the images, may be equally important when comparing two images using signature matching. Therefore, one enhancement to signature matching is to employ signatures that have differently weighted elements.

In the context of ALPR, for instance, it may be more important to compare certain portions or characteristics of license plates—e.g., license plate number, issuing authority, design, font type, etc.—than other portions or characteristics—e.g., empty "whitespace," license plate frame, etc. Thus, to improve ALPR signature matching, elements within signatures of license plate images may be weighted to emphasize the portions or characteristics that are more probative of similarity than other portions or characteristics. However, it may be difficult to determine and program an optimal set of weights for a given license plate, given the wide variety of fonts, backgrounds, and other characteristics of license plates across different issuing authorities and designs.

Accordingly, there is a need for methods and systems for determining one or more optimal sets of weights for use in weighted image signature matching. Such a need is particularly acute in the area of ALPR.

SUMMARY OF THE INVENTION

The present disclosure relates generally to methods and systems for creating synthetic images of real-world objects in order to build a robust ground truth database that may be used as inputs to a machine learning algorithm, such as a distance learning algorithm to better enable automatic recognition of actual images of real-world objects, such as license plates, in the future. In some embodiments, a synthetic license plate image is created using a template of a particular license plate style available from a license plate issuing authority. Using known characteristics about character fonts, dimensions, and spacings for the particular license plate style, a plurality of synthetic license plate images is created by superimposing randomly generated license plate numbers on the template. The synthetic license plate images are then subjected to a variety of transformations intended to mimic real-world conditions in which authentic license plate images may be captured, including applying perspective, blurring, contrast, physical deterioration, and other transformations to the images. This process may be repeated for each style of license plate associated with each issuing authority, and all images may be stored, in association with their known license plate numbers and issuing authorities (hereinafter "identification information"), in a ground truth database. Using these techniques, a robust ground truth database may be generated without the need for extensive manual effort.

Signatures may be computed for each of the synthetic license plate images (as well as for any authentic license plate images stored in the ground truth database). In one embodiment, Fisher vectors may be used to represent the signatures. Similarity scores may then be computed by comparing various signatures to each other. As part of each comparison, a machine distance learning algorithm may incrementally adjust a set of weights associated with various signature segments to increase the likelihood that comparisons between signatures of license plates having identical ground truth result in higher similarity scores and comparisons between signatures of licenses plates having differing ground truth result in lower similarity scores.

Once an optimal set of weights has been determined for performing accurate signature matching, the resulting strength of the optimized weighted signature matching algorithm may be applied in a variety of contexts. In one embodiment, authentic images of real-world vehicle license plates may be captured in real-time, such as in the course of monitoring vehicles for speed limit or high-occupancy vehicle (HOV) compliance. A signature may be computed for the authentic license plate image, and the signature may be compared to various signatures of synthetic license plate images in the ground truth database (e.g., using a set of signature weights determined by the machine distance learning algorithm). If a sufficiently high similarity score is found between the authentic license plate image signature and a synthetic license plate image signature, then identification information for the authentic license plate image may be determined by consulting the ground truth associated with the synthetic image.

In another embodiment, authentic images of a plurality of real-world license plates may be captured over time and stored in a database in signature form. At the time of capture and storing, identification information for such license plate images may not be known or determined. At a later time, it may be desired to determine whether a particular vehicle had previously been detected by one or more traffic monitoring systems. Thus, identification information for the vehicle's license plate may be entered into a process that may generate one or more synthetic license plate images using the identification information. The database may then be queried using the signatures of the synthetic license plate images to determine if any of the authentic license plate image signatures match any of the synthetic license plate image signatures to a sufficient degree of similarity. If a match is found, the authentic license plate image associated with the matching authentic signature may be manually or automatically analyzed to determine whether it contains the identification information associated with the vehicle that is being sought.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

This patent or application contains at least one drawing executed in color. Copies of this patent or patent application publication with color drawings will be provided by the Office upon request and payment of the necessary fee.

The accompanying drawings, which are incorporated in and constitute a part of this specification, illustrate various embodiments of the invention and together, with the description, serve to explain the principles of the invention. In the drawings.

DETAILED DESCRIPTION

Figure 1:
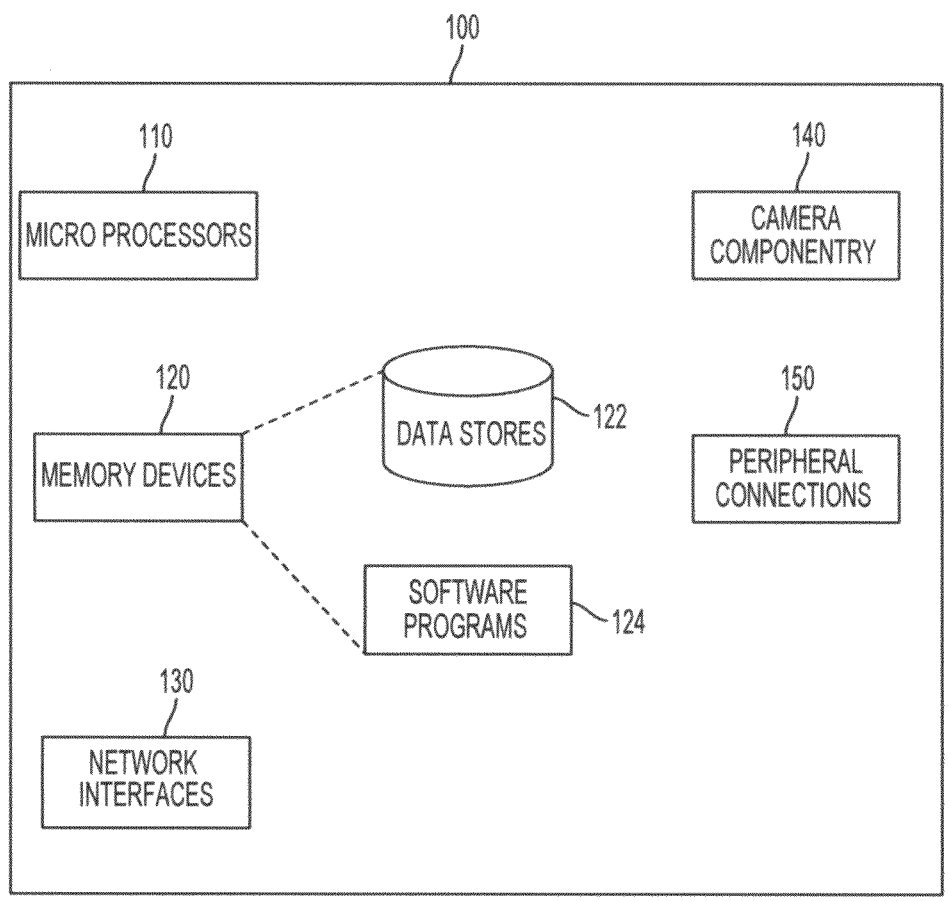
FIG. 1 is a diagram depicting exemplary hardware componentry of a system configured to perform the described embodiments, consistent with certain disclosed embodiments.

The following detailed description refers to the accompanying drawings. Wherever possible, the same reference numbers are used in the drawings and the following description to refer to the same or similar parts. While several exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims.

FIG. 1 is a diagram depicting exemplary hardware componentry of a system configured to perform the described embodiments, consistent with certain disclosed embodiments. System 100 may comprise any one or more computing devices that may be configured to perform the described embodiments. For example, system 100 may comprise a one or more microprocessors 110 of varying core configurations and clock frequencies; one or more memory devices or computer-readable media 120 of varying physical dimensions and storage capacities, such as flash drives, hard drives, random access memory, etc., for storing data, such as images, files, and program instructions for execution by one or more microprocessors 110; one or more network interfaces 130, such as Ethernet adapters, wireless transceivers, or serial network components, for communicating over wired or wireless media using protocols, such as Ethernet, wireless Ethernet, code divisional multiple access (CDMA), time division multiple access (TDMA), etc.; one or more camera components 140 for capturing images of real-world, external, optical phenomena using analog or digital technologies; and one or more peripheral connections 150, such as universal serial bus (USB) connections or video interfaces. The components of system 100 need not be enclosed within a single enclosure or even located in close proximity to one another.

Memory devices 120 may further be physically or logically arranged or configured to provide for or store one or more data stores 122, such as relational or hierarchical databases, and one or more software programs 124, which may contain interpretable or executable instructions for performing one or more of the disclosed embodiments. Those skilled in the art will appreciate that the above-described componentry is exemplary only, as system 100 may comprise any type of hardware componentry, including any necessary accompanying firmware or software, for performing the disclosed embodiments.

Figure 2A:
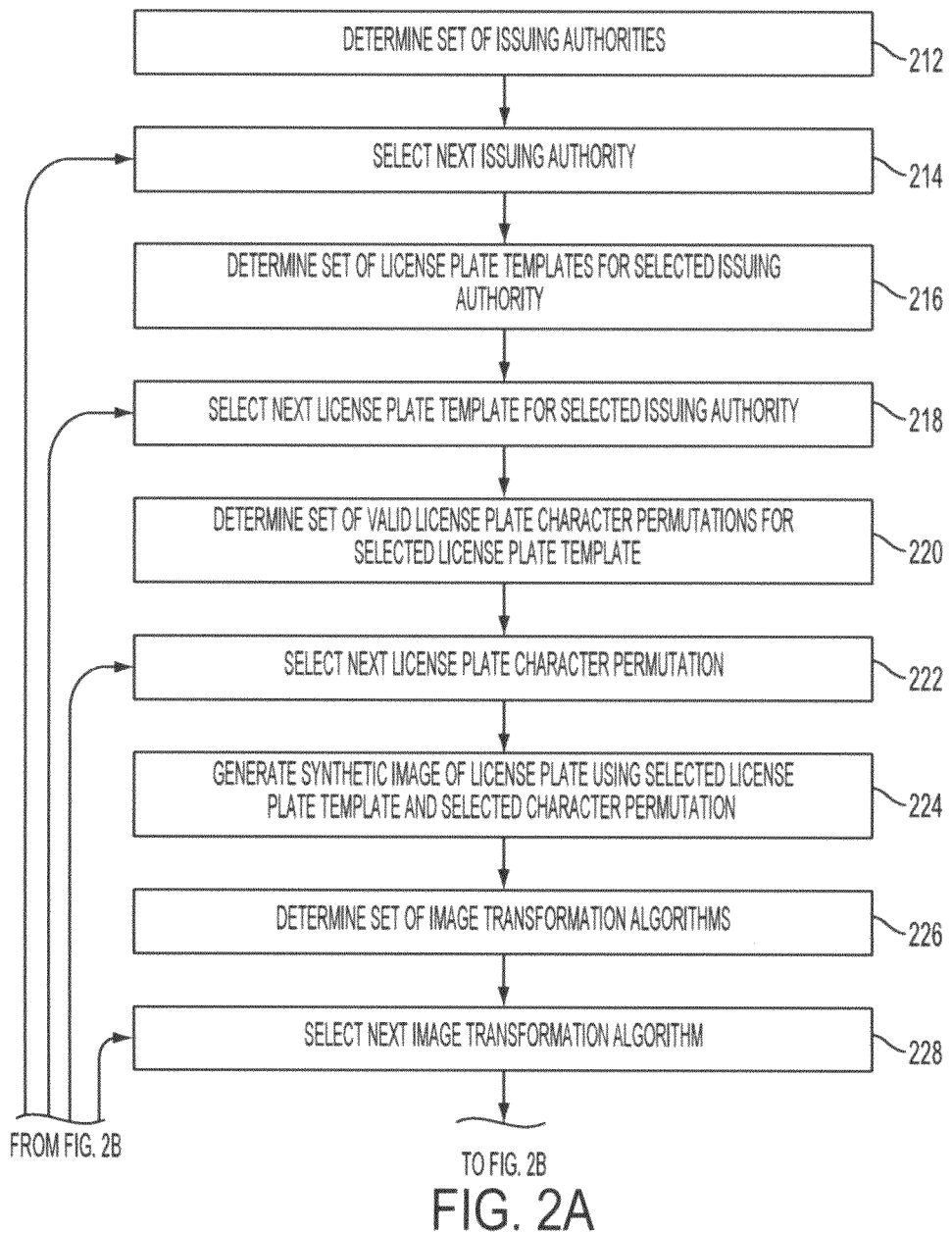
FIG. 2 is a flowchart illustrating an exemplary method of building a ground truth database using synthetic images, consistent with certain disclosed embodiments.
Figure 2B:
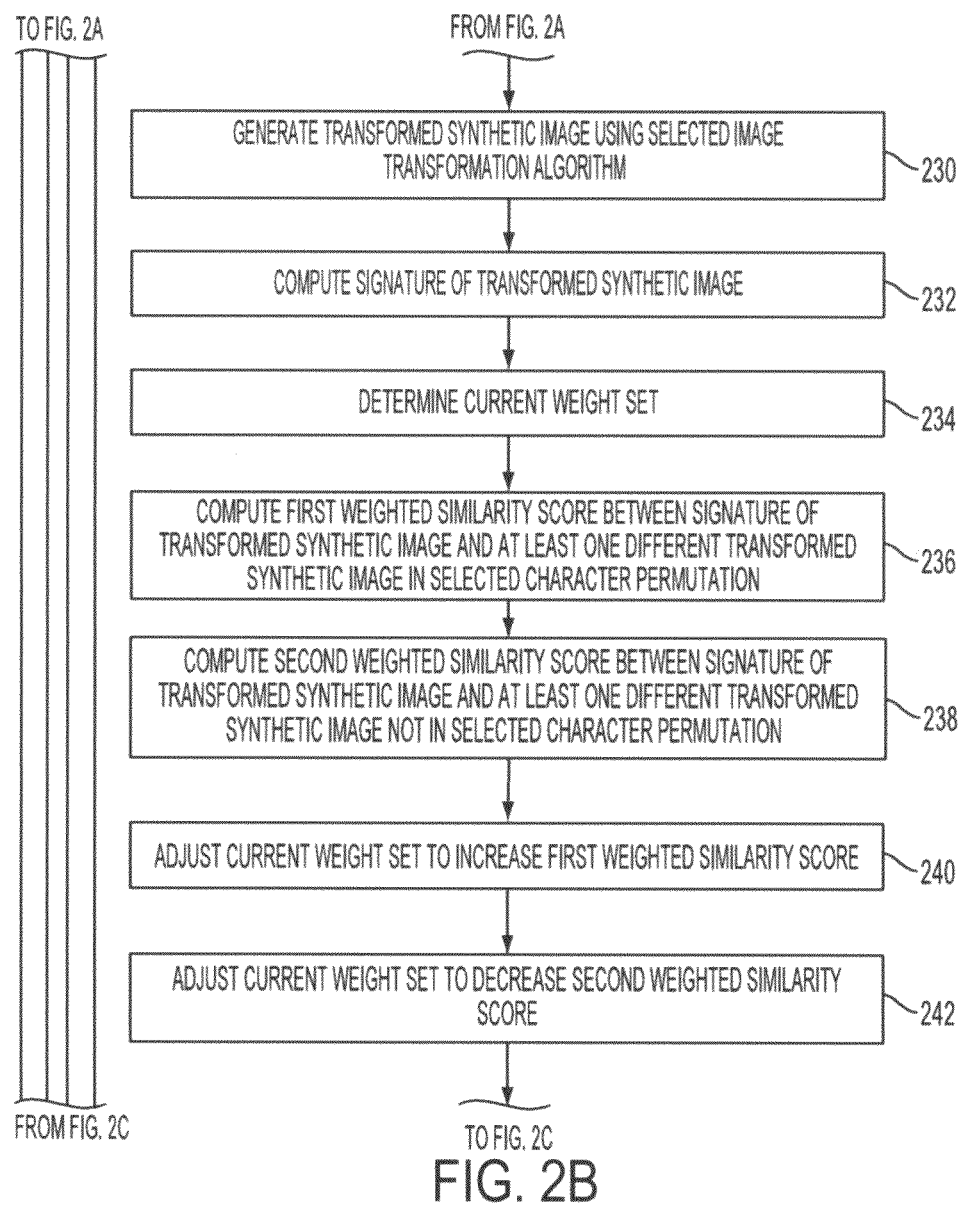
Figure 2C:
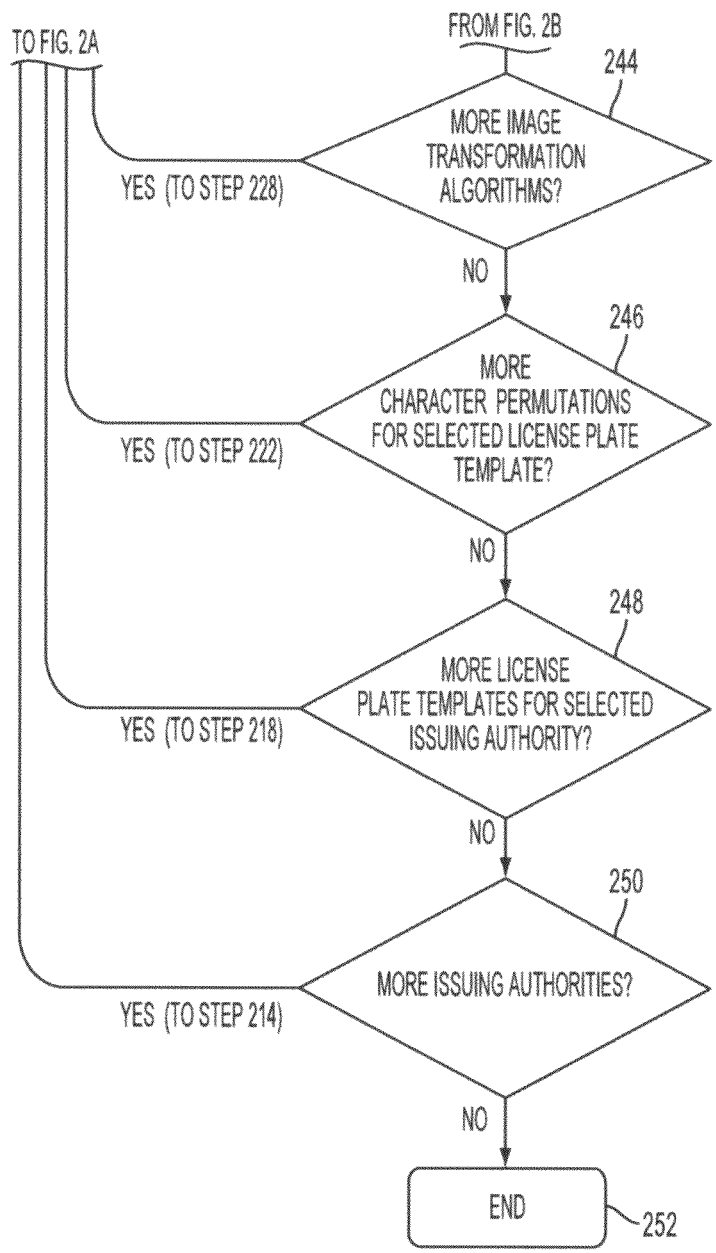

As described above, in order to obtain an optimal set of weights for performing weighted image signature matching, it may first be necessary to have a sufficient number and diversity of inputs to a machine distance learning algorithm. In some embodiments, such inputs may be created by generating a plurality of synthetic images tailored to mimic real-world images. FIG. 2 is a flowchart illustrating an exemplary method of building a ground truth database using synthetic license plate images, consistent with certain disclosed embodiments.

In particular, the exemplary steps outlined in FIG. 2 set forth an algorithm for generating a comprehensive synthetic image collection in which at least one synthetic image is generated for each valid character permutation of each license plate template offered by each issuing authority. However, because it may be impractical to generate such a large number of synthetic images (potentially on the order of millions or billions of unique permutations), the steps set forth in FIG. 2 may be modified to generate a robust, albeit less than perfectly comprehensive, image collection. Therefore, those skilled in the art will appreciate that the steps set forth in FIG. 2 are exemplary only, and are intended merely to illustrate certain basic operations that may be used to generate a ground truth database of synthetic images.

In step 212, system 100 may determine a set of issuing authorities. An issuing authority may be considered any entity, such as a state or government agency, that is authorized to issue a license plate or for which the disclosed enhanced ALPR system could be used to recognize license plates. Put differently, an issuing authority may be considered a namespace within which a particular license plate number is unique. For example, although two different license plates may each have the license plate number "EUC 9012," those two license plates may still be regarded as distinct if one of them is a New York license plate and the other is a Montana license plate. Thus, in some embodiments, a license plate may be uniquely identified by the combination of its license plate number and issuing authority. If the goal is to generate a comprehensive set of synthetic license plates, then step 212 may comprise determining all states and government agencies for which ALPR may be performed using the disclosed embodiments. In step 214, a particular ("next") issuing authority from the set of step 212 is selected. If step 214 is being performed for the first time, the "next" issuing authority may simply be the first issuing authority in the set.

In step 216, system 100 may determine a set of license plate templates for the selected issuing authority. In some embodiments, a license plate template may refer to a particular visual style of a license plate offered by an issuing authority. For example, many issuing authorities allow motorists to select or purchase specialty plates that promote an idea (e.g., "KIDS FIRST" or "Reduce-Reuse-Recycle") and include background images or color layouts consistent with the promoted idea. Because a "KIDS FIRST"-themed Virginia license plate may be markedly different from a Virginia "Reduce-Reuse-Recycle" license plate, despite both plates being associated with the same issuing authority, it may be helpful to generate one or more synthetic license plate images for each template as an input to a machine learning algorithm. In step 218, a particular ("next") template from the set of step 216 is selected. If step 218 is being performed for the first time, the "next" template may simply be the first template in the set.

In step 220, system 100 may determine a set of valid license plate character permutations for the selected license plate template and/or for the selected issuing authority. For example, a particular issuing authority may issue license plate numbers for particular templates only in accordance with certain rules. Such rules may comprise a set of valid characters (e.g., ASCII alphanumeric characters only), a maximum or minimum number of characters permitted on a license plate, or enforced character patterns (e.g., mandatory inclusion of at least one number, mandatory three-letter pattern followed by four-number pattern, mandatory whitespace requirements, etc.). Thus, step 220 may comprise generating a plurality of random license plate character permutations (for simplicity, sometimes referred to as "license plate numbers," even if non-numeric characters are included) according to the determined rules. In step 222, a particular ("next") character permutation from the set of step 220 is selected. If step 222 is being performed for the first time, the "next" character permutation may simply be the first character permutation in the set.

Figure 3A:
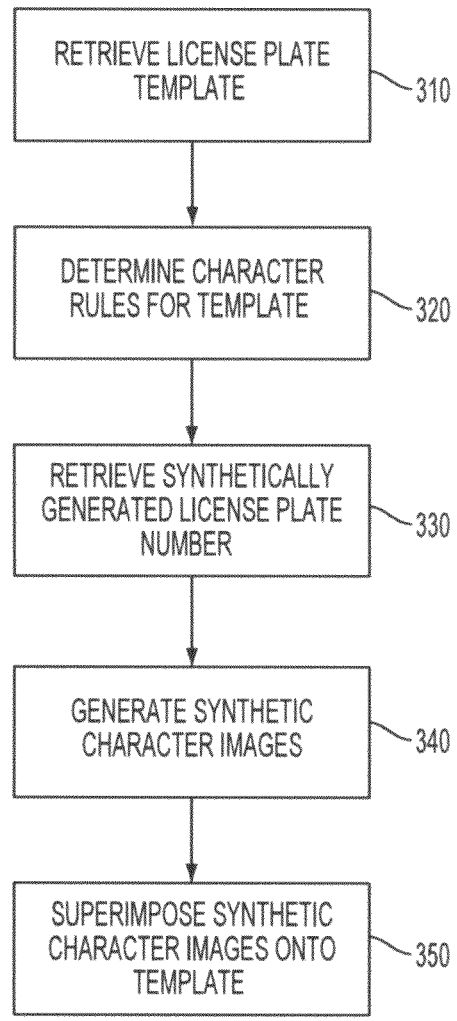
FIG. 3a is a flowchart illustrating an exemplary method of generating a synthetic license plate image, consistent with certain disclosed embodiments.
Figure 3B:
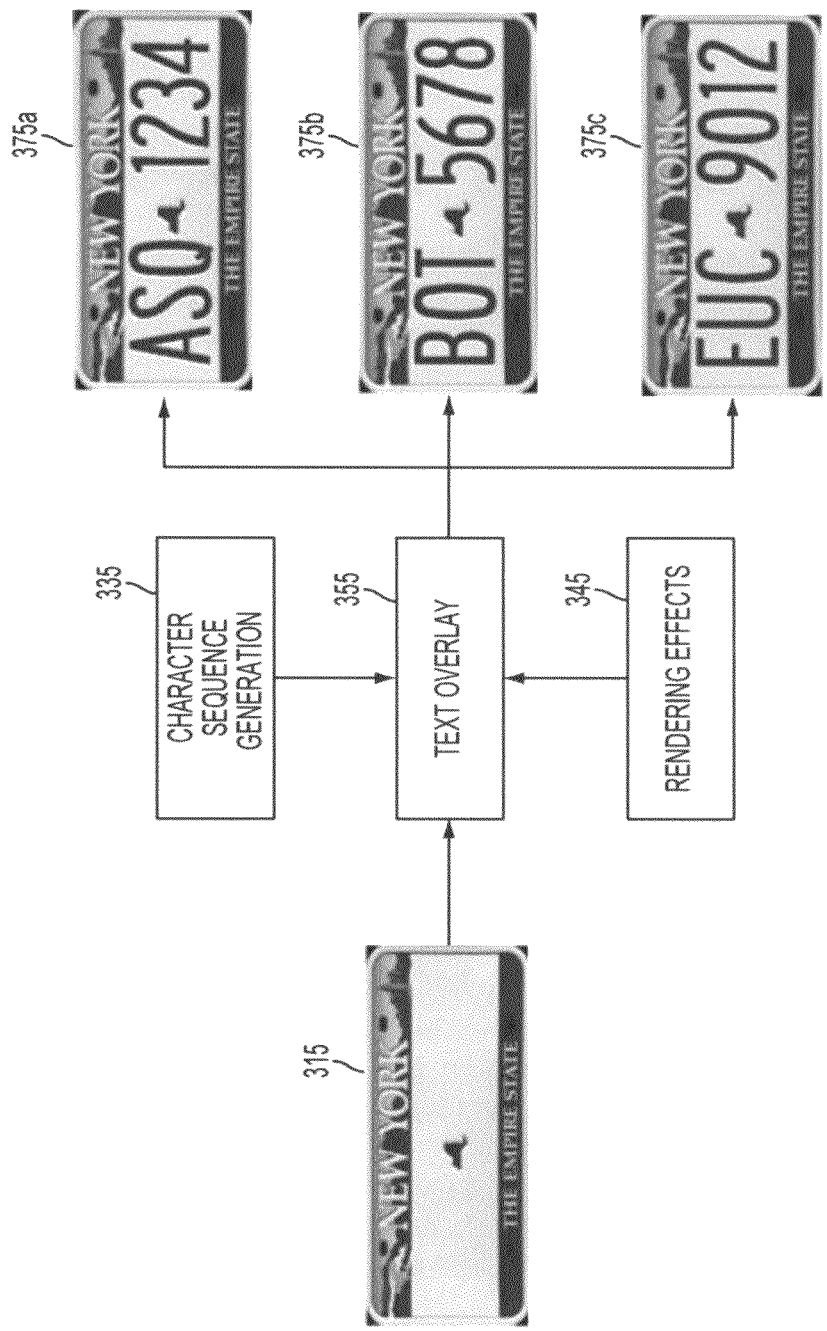
FIG. 3b is a flowchart illustrating an exemplary method of generating a synthetic license plate image, consistent with certain disclosed embodiments.

In step 224, system 100 may generate a synthetic image of a license plate using the selected license plate template and the selected character permutation. FIGS. 3a and 3b illustrate exemplary operations for performing such a synthetic image generation process, consistent with certain disclosed embodiments. In step 310, system 100 may retrieve a license plate template. In some embodiments, the license plate template may simply be an image of particular license plate template offered by an issuing authority with or without identification characters on it, such as image 315, since several issuing authorities provide images of the template offerings on their websites. Such images typically depict a license plate template in the form of an ideal license plate having no defects or image capture flaws; such images may be synthetically generated themselves.

In step 320, system 100 may determine character rules for the template. Here "character rules" may refer not to rules for valid character permutations, as in step 220, but rather to how identification characters be visually depicted on a particular license plate template. For example, although some issuing authorities have begun to employ digital plate-making technologies, in which standard digital fonts (e.g., Times New Roman, Arial, etc.) are used and authentically represented by the identification characters placed on issued license plates, several traditional license plate-making processes use a form of typesetting that does not truly conform to the definition of a font. Thus, for some states (e.g., New York and Delaware), as of the date of this application, it may not be possible to retrieve exact digital fonts for various license plate templates. Instead, in some embodiments, such fonts may be synthesized.

In one embodiment, a non-standard font for a particular license plate template may be synthesized by acquiring digital camera images of a sufficient number of real license plates to capture all alphanumeric characters valid for the template (e.g., 26 letters and 10 digits). The images may then be pre-processed using a series of image processing functions, such as correction for perspective distortion, cropping of character region, binarization, and character segmentation to produce individual character images. The character images may then be supplied to a font synthesis software package, such as the FontLAB ScanFont™ and TypeTool™ bundle, to generate font outline glyphs from the binary character images and output a TrueType font.

Determining character rules for the template may also comprise determining appropriate colors, sizes, and spacings for identification characters in the template, as well as determining what kind of embossing or protrusion effects are typical for identification characters within a template as a result of how such characters are imprinted, pressed, or printed onto physical license plates. Those skilled in the art will appreciate that the foregoing operations for determining graphical rules for characters within a specific template are exemplary only, and that other techniques may be used.

In step 330, a synthetically generated license plate number may be retrieved, such as a randomly generated character permutation selected in step 222. In step 340, system 100 may generate synthetic character images using the synthetically generated license plate number retrieved in step 330 and the character rules determined in step 320. In step 350, system 100 may superimpose the synthetically generated character images onto the template, for example according to spacing or other character rules determined in step 320. Thus, FIG. 3b depicts a blank license plate template image 315, a character sequence generation process 335, and a rendering effects process 345 as inputs to a text overlay process 355. FIG. 3b also depicts exemplary synthetic license plate images 375a-c that might be generated using the operations of FIG. 3a.

At this point in the process, a synthetic license plate image has been generated. However, synthetic license plate images 375a-c may not accurately represent the kinds of license plate images that would be captured by actual cameras with respect to actual moving vehicles. As a result, in some embodiments, once generated, a synthetic license plate image may be subjected to one or more transformations intended to cause the image to more closely resemble an authentic license plate image capture. Returning to FIG. 2, in step 226, system 100 may determine a set of possible image transformations at its disposal for that purpose. That is, system 100 may identify a set of distinct image transformation algorithms stored in memory 120, such as one or more software programs 124. In step 228, a particular ("next") image transformation algorithm from the set of step 226 is selected. If step 228 is being performed for the first time, the "next" image transformation algorithm may simply be the first algorithm in the set.

Figure 4:
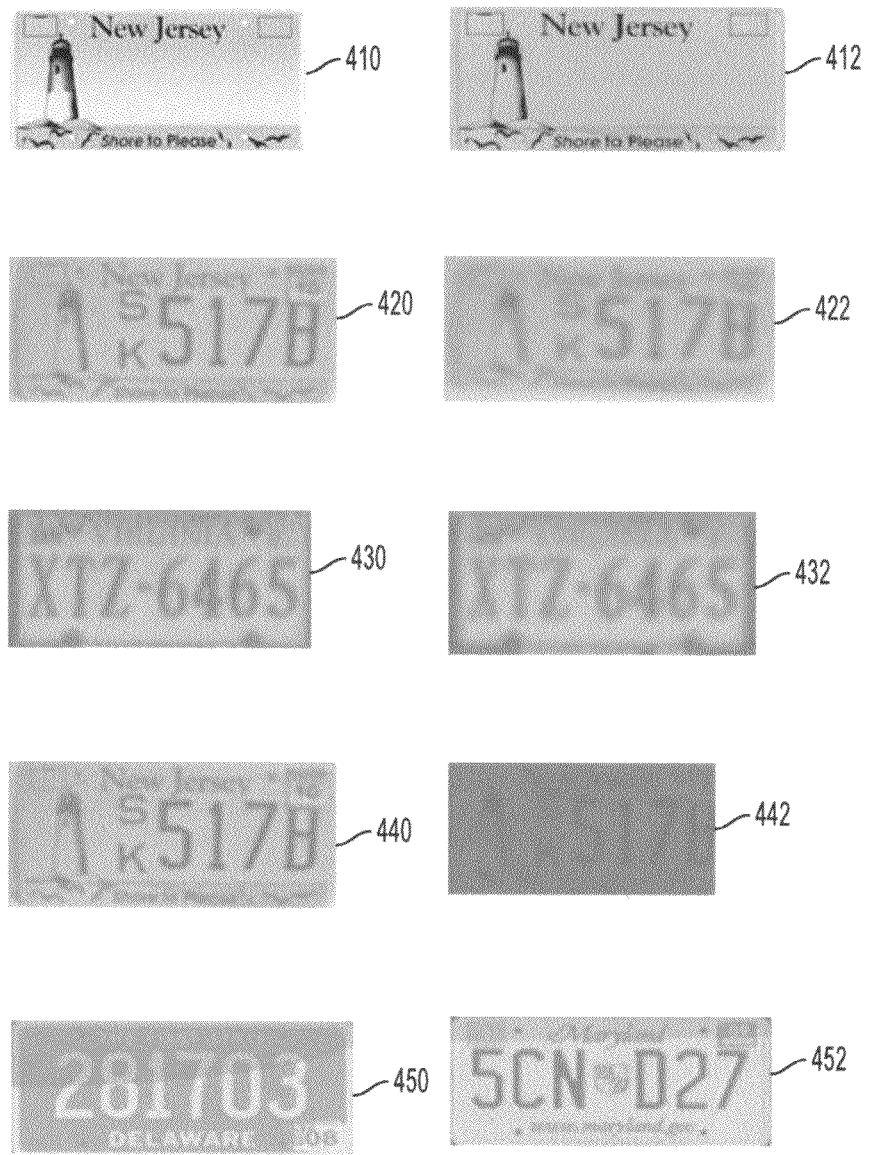
FIG. 4 is a diagram depicting exemplary transformations that may be applied to a synthetic license plate image, consistent with certain disclosed embodiments.
Figure 4:
Figure 4:
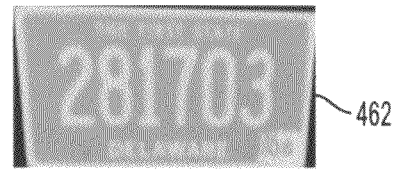
Figure 4:
Figure 4:
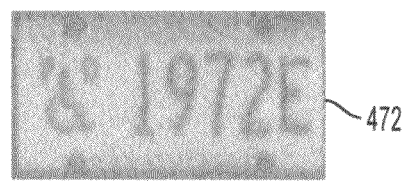
Figure 4:
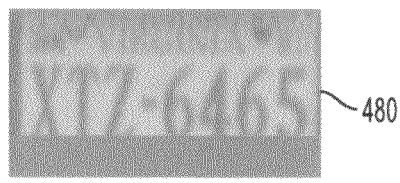
Figure 4:
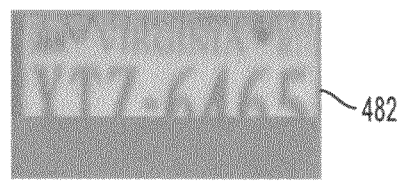
Figure 4:
Figure 4:

In step 230, system 100 generates a transformed synthetic image by applying the selected transformation algorithm to the synthetically generated license plate image. FIG. 4 illustrates various transformation algorithms that may be applied to a synthetically generated license plate image in order to cause the synthetic image to more closely resemble an authentic license plate image.

For example, many ALPR systems use infra-red (IR) cameras to capture vehicle images with high signal-to-noise ratios across a variety of weather conditions and times of day, including nighttime. As a result, in some ALPR systems, authentic image captures may be largely black and white. Therefore, in order to provide synthetic image inputs into the machine learning algorithm that more closely resemble actual image captures, system 100 may apply a color-to-infra red transformation. One technique for applying such a transformation is to represent the colored synthetic image using a cyan-magenta-yellow-black (CMYK) subtracting color model. If the cyan (C), magenta (M), and yellow (Y) colorants are considered transparent to IR, while the black (K) colorant is considered opaque, then, assuming a 100% gray component replacement strategy, a color-to-infrared transformation may be applied to a synthetic image using the formula:

$$IR = \max(w_R R, w_G G, w_B B),$$

where $w_R$, $w_G$, and $w_B$ are weights that represent the relative IR transmittances of plate materials that reflect strongly in the red (R), green (G), and blue (B) bands.

Such weights can also be viewed as parameters to be optimized based on corresponding RGB and IR images. In some embodiments, the mapping may also depend on other factors that could affect IR transmittances from license plates, such as license plate material composition and plate temperature. FIG. 4 depicts an example of a color-to-infrared transformation in which a colored synthetic license plate image 410 is transformed into a black and white image 412 (intended to mimic an IR-captured license plate image) using the weights: $w_R = 0.35$, $w_G = 1.0$, and $w_B = 0.35$. Those skilled in the art will appreciate that a color-to-infrared transformation may be implemented using other techniques.

Authentic license plate images may also reflect various degrees of blur due to vehicle motion and/or a camera being out of focus. In some embodiments, a synthetically generated license plate image may simulate such blur using a linear lowpass box filter of size N×N, where N determines the extent of blur. A value of N may be selected to cause the simulation to most closely match that of live captures. For example, an appropriate size of N may be derived by examining sample camera captures of actual license plates and determining a mean or median extent of blur in those images, or computing an average absolute gradient at the zero crossings. If examination of actual images reveals varying degrees of blur measurements, a range of nominal values for N (e.g., between 3 and 6), may also be used. In FIG. 4, images 420 and 422 depict synthetically generated license plate images in which blur transformations of N=3 and N=6, respectively, have been applied. Those skilled in the art will appreciate that a blur transformation may be implemented using other techniques.

Variation in plate character resolution may also be driven by two major factors: camera imager and field of view. Camera image sensors are primarily rated by the sum (referred to as the density for standard sensor sizes) of their pixel imaging elements. For the same number of elements, the geometric arrangement of the imaging elements on the sensor can also vary. The field of view is a function of the camera optics and the distance between the camera and the vehicle plate. These two major factors may convolve to yield a resolution measured as the number of image pixels per character based on a loose assumption that character height is two times its width. Therefore, in some embodiments, a character resolution transformation may be applied by creating an antialiased downsampling of a synthetically generated image and upsampling the antialiased image back to its original size, in effect reducing the number of pixels used to approximate the license plate. In FIG. 4, images 430 and 432 depict synthetically generated license plate images in which character resolutions transformations mimicking a high-resolution authentic image capture and a low-resolution image capture, respectively, have been applied. Those skilled in the art will appreciate that a character resolution transformation may be implemented using other techniques.

In authentic license plate image captures, the lighting incident to the image capture may also play a significant role in ALPR performance. For example, poor lighting may result in low contrast in the captured image, which may adversely affect character segmentation and/or OCR. Therefore, in order to produce synthetically generated license plate images that mimic authentic license plate image captures, a contrast transformation may be applied. In one embodiment, the contrast C of an image may be defined by the formula:

$$C = Y_m^{high} - Y_m^{low}$$

where $Y_m^{high}$ is the average of all pixels in the highest M-tile of sorted luminance values within the image, and $Y_m^{low}$ is the average of pixels in the lowest M-tile of sorted luminance within the image. A target contrast level may be determined by analyzing metrics associated with authentic license plate image captures, and luminance values of pixels in the image may be adjusted (e.g., proportionally) to ensure that the range of adjusted luminance values does not exceed the target C. In FIG. 4, image 442 depicts an adjusted contrast transformation of synthetically generated license plate image 440 (as can be seen, image 440 has been subjected to one or more transformations prior to the contrast transformation). Those skilled in the art will appreciate that a contrast transformation may be implemented using other techniques.

In ALPR, it is frequently necessary to provide some level of illumination for areas on vehicles in which license plates are located. Such illumination serves to provide increased contrast and to reveal additional detail in captured images. However, directional illumination can produce strong shadows on the plate, which can also affect character segmentation and/or OCR. Moreover, if the illuminant is located higher than the license plate being captured, which is common, the surrounding license plate frame may cast a shadow on the upper portion of the license plate. Therefore, a shadow transformation may be applied to synthetically generated license plate images. In one embodiment, a shadow transformation may operate by receiving a shadow profile function p(x, y) over the support of the plate image and applying a transformation according to the formula I'(x, y)=I(x, y)*p(x, y), where I(x, y) is the original illumination profile of the image, I'(x, y) is the transformed illumination profile of the image as a result of applying the shadow profile function, and x and y are pixel coordinates. In FIG. 4, images 450 and 452 depict synthetically generated license plate images in which shadow transformations have been applied. Those skilled in the art will appreciate that a shadow transformation may be implemented using other techniques.

Additional transformations, such as geometric transformations 460 and 462, physical deformity or "plate noise" transformations 470 and 472, character or background occlusions 480 and 482, and vehicle insertion transformations 490 and 492 may be performed. Those skilled in the art will appreciate that the foregoing transformations are exemplary only. Moreover, system 100 may apply two or more transformation algorithms to a single synthetically generated license plate image.

Returning to FIG. 2, in step 232, system 100 may compute a signature of the transformed synthetic image. In some embodiments, system 100 may compute the signature as a Fisher vector or a normalized Fisher vector. Descriptions of techniques that may be used to represent an image as a Fisher vector or a normalized Fisher vector are more fully set forth in U.S. Pat. No. 7,680,341 and U.S. patent application Ser. No. 12/859,898, which are hereby incorporated by reference.

Figure 5:
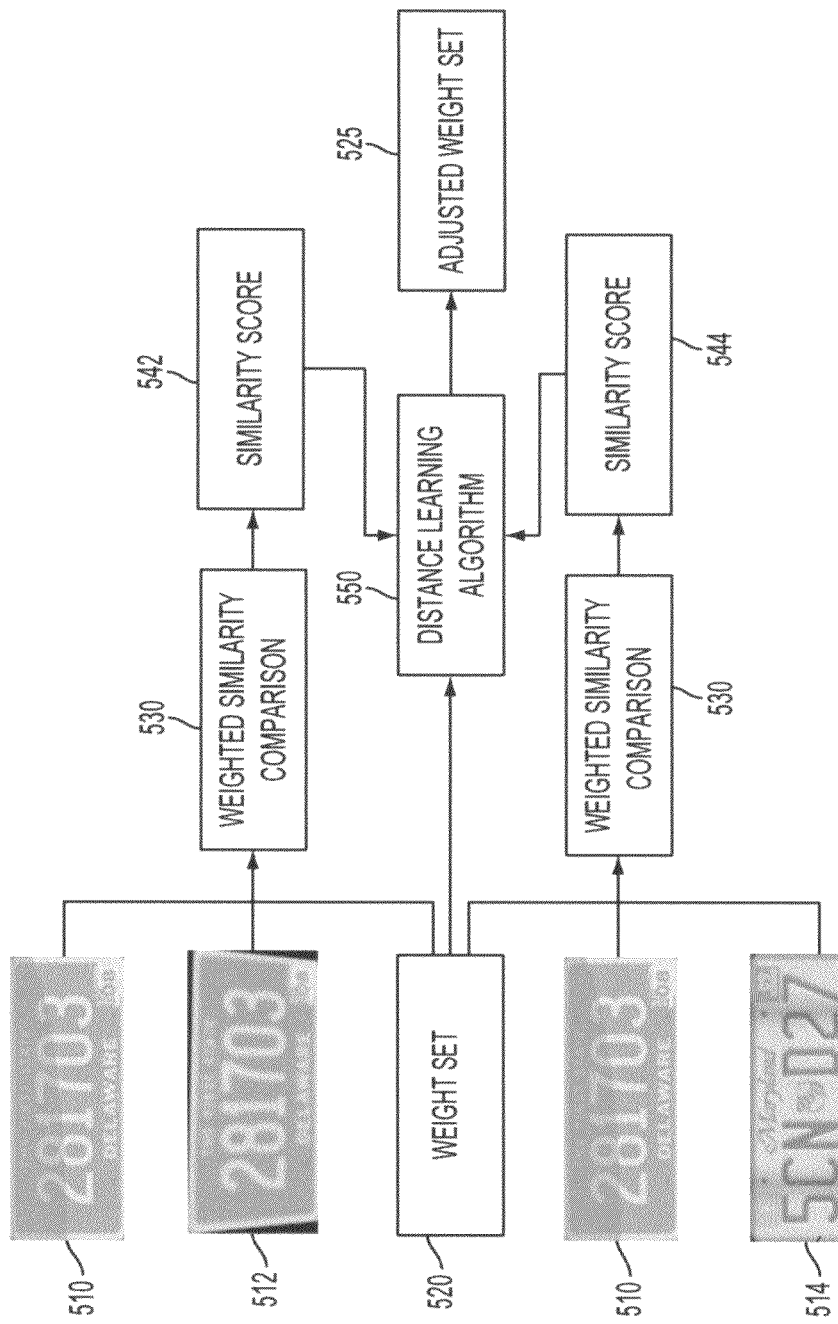
FIG. 5 is a diagram depicting an exemplary method of furthering a distance learning algorithm using signature comparisons between synthetic images, consistent with certain disclosed embodiments.

At this point, the signature of the transformed synthetic image may be provided as an input to a machine learning algorithm, which may also be a distance learning algorithm. This may be done, for example, by computing a weighted similarity score between the signature of the transformed synthetic image and another image of a license plate having the same template and identification information but having different transformations using a particular set of signature weights (steps 234 and 236). For example, as depicted in FIG. 5, a synthetically generated and transformed license plate image 510 may be compared to another synthetically generated and transformed license plate image 512. A weight set 520 may also be provided as an input to the weighted similarity comparison 530, resulting in a first similarity score 542 between image 510 and image 512. Image 510 and image 512 have the same identification information, but have been subjected to different transformations.

As part of the machine learning process, system 100 may also compute a weighted similarity score between the signature of the transformed synthetic image and another image of a license plate having different identification information (i.e., not having the same character permutation and issuing authority combination) using a particular set of signature weights (step 238). For example, image 510 may be compared (block 530) to image 514, which represents a synthetically generated and transformed license having different identification information. A weight set 520 may also be provided as an input to the weighted similarity comparison 530, resulting in a second similarity score 544 between image 510 and image 514. In FIG. 5, image 514 represents a license plate having a different character permutation, issuing authority, and license plate template. However, step 238 may also be performed using an image 514 of a license plate having the same character permutation, but a different issuing authority and license plate template, or a different character permutation, but the same issuing authority and license plate template, etc.

The purpose of the machine learning process is to improve the accuracy with which system 100 is able to determine identification information associated with an authentic image capture of a real-world license plate. Therefore, similarity scores 542 and 544 may be fed into a distance learning algorithm 550, along with the weight set 520 that was used to generate the scores. Because images 510 and 512 reflect license plates that have the same identification information, distance learning algorithm 550 may adjust weight set 520 to increase similarity score 542 (step 240). And, because images 510 and 514 reflect license plates that do not have the same identification information, distance learning algorithm 550 may adjust weight set 520 to decrease similarity score 544. The output of these processes is an adjusted weight set 525 that, if used as an input to weighted similarity comparisons 530 between images 510 and 512 and images 510 and 514, would result in a higher similarity score 542 and a lower similarity score 544.

The remaining steps 244-252 depicted in FIG. 2 serve to illustrate various levels of iteration through the sets of transformations, character permutations, license plate templates, and issuing authorities known to system 100. Thus, if followed, the steps depicted in FIG. 2 would operate to ensure that a different synthetic license image is generated for each transformation for each valid character permutation for each license plate template for each issuing authority. Further, each such transformed synthetic license plate image would be compared to at least one another license plate image having the same identification information and to at least one other license plate image having different identification information (either of which may be synthetic or authentic). The results of both comparisons would be fed into distance learning algorithm 550 to adjust one or more weight sets to increase weighted similarity scores between the former images and decrease weighted similarity scores between the latter images.

However, those skilled in the art will appreciate that not all of these steps need be performed in order for the system to function. Rather, only select issuing authorities, license plate templates, character permutations, transformations, and/or comparisons may be used in order to reduce computational or memory burdens. For example, rather than generating random character permutations, system 100 may be programmed to use only those character permutations that have actually been used for issued license plates by an issuing authority.

Once one or more sets of optimal weights has been determined using the above described machine learning process using synthetic images, such weights may be used to more accurately determine vehicle license plate numbers from images captured of vehicles in real time. Exemplary operations are depicted in FIG. 6.

Figure 6:
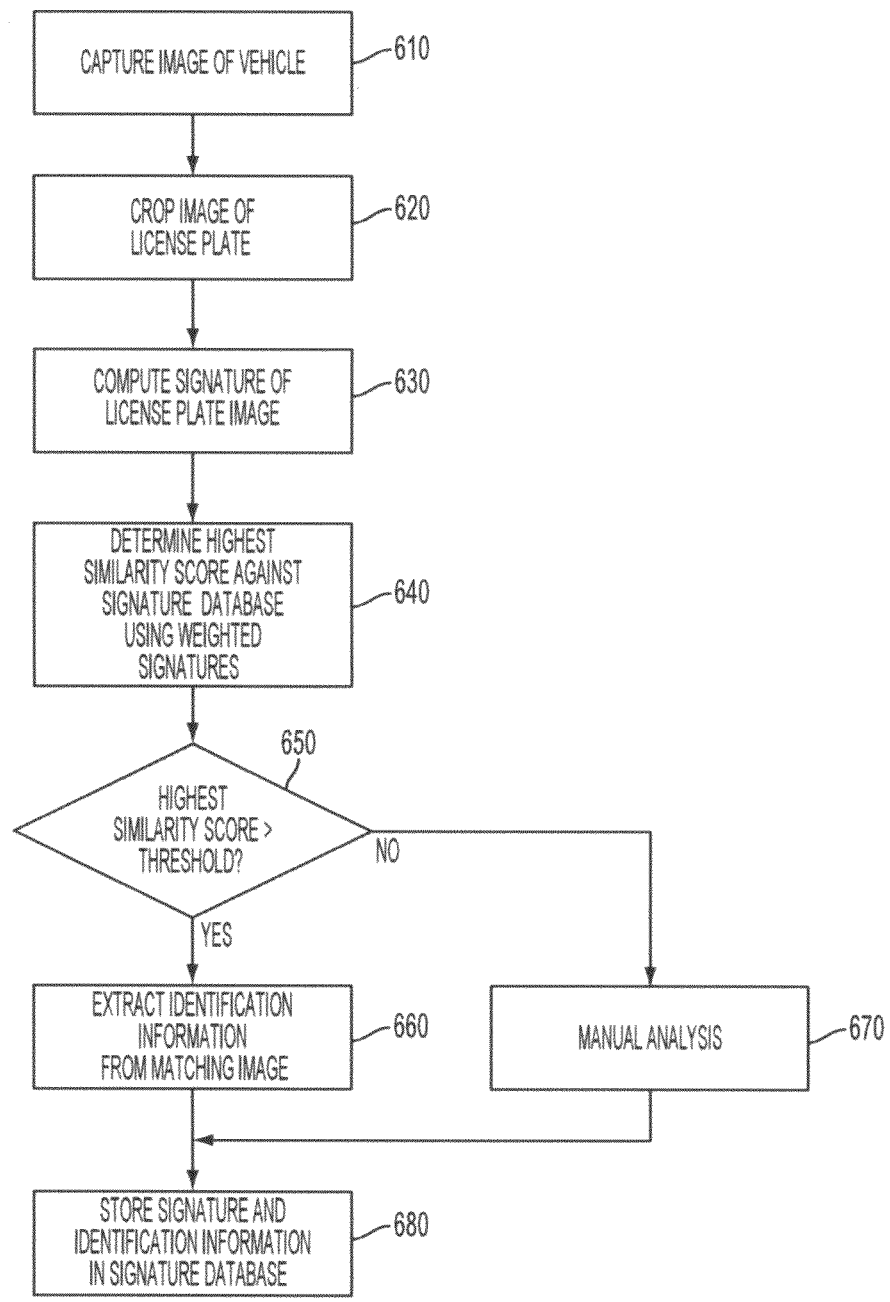
FIG. 6 is a flowchart depicting an exemplary method of determining identification information associated with an authentic license plate image, consistent with certain disclosed embodiments.

FIG. 6 is a flowchart depicting an exemplary method of determining identification information associated with an authentic license plate image, consistent with certain disclosed embodiments. FIG. 6 depicts various steps that may be performed in order to identify a vehicle by its license plate once an image has been captured of the vehicle, such as by an automatic traffic camera.

In step 610, a traffic camera or other device may capture an image of a vehicle as that vehicle is traveling down a road or other thoroughfare. That image may then be cropped or otherwise modified to isolate an image of just the license plate on the vehicle (step 620). In step 630, system 100 or other componentry may calculate a signature of the license plate image, such as a Fisher vector.

Now, that signature (hereinafter "query signature") may be compared against various signatures stored in a database in order to find a match. The database may comprise a plurality of signatures of license plate images for which ground truth (e.g., identification information) is known and potentially also stored in the database. These signatures may be of authentic and/or synthetic license plate images—although, in some embodiments, it may be preferable to include signatures of synthetic license plate images in the database in order to provide a large number of signatures that may potentially match the query signature. Comparisons between the query signature and the signatures in the database may be performed using one or more sets of optimal weights obtained by the machine learning process described above. In some embodiments, the comparison may be performed using a low-rank symmetric decomposition.

A variety of techniques may be used to efficiently query the signature database such that it is not necessary to compute a similarity score between the query signature and every signature in the database. In one embodiment, the signature comparison process may be bifurcated between determining an issuing authority for the captured license plate and determining a license plate number for the captured license plate. For example, the above described synthetic image generation process may also be applied to a machine learning process that focuses solely on identifying an issuing authority, such as a state or governmental agency, from license plate images.

Using this approach, the issuing authority of the captured license plate image may first be determined using signature matching, weighted or otherwise. Once the issuing authority is determined, a query signature that encompasses image information associated with the license plate number may be compared only against those signatures in the signature database that are associated with license plates issued by the same authority. Using this approach, the number of comparisons may be reduced by a factor of at least 51. Similar approaches may be used to narrow down the signatures in the signature database by license plate design.

In other embodiments, entries in the signature database may be indexed according to their constituent signature segments. Using this approach, signatures may be iteratively excluded from the query if one of their segments is outside an acceptable range associated with a corresponding segment in the query signature. Those skilled in the art will appreciate that there may be other techniques for comparing the query signature with entries in the signature database in an efficient manner that avoids the need for a one-to-one comparison with each entry.

In one embodiment, as described in steps 640 and 650, the signature having the highest similarity score to the query signature may be selected (step 640). It may then be determined whether that selected signature has a sufficiently high similarity score in accordance with some threshold, predetermined or otherwise (step 650). If the selected signature has a sufficiently high similarity score (step 650, Yes), then the identification information associated with the matching signature may be extracted from the signature database and identified as the identification information associated with the captured license plate image (step 660). In other words, it may be determined that the captured license plate image has the same license plate number and issuing authority as the matching signature. This association may be true regardless of whether the matching signature in the database was derived from an authentic or a synthetic image.

If, however, a match is not found, or the selected signature does not have a sufficiently high similarity score (step 650, No), then a variety of other operations may be performed. For example, the image of the captured license plate may be sent for manual analysis (step 670) or OCR analysis to determine the identification information associated with the license plate. In any event, whether a proper match is found or not, once the identification information has been determined, that information may be associated with the query signature and both pieces of information may be stored in the signature database for use in future matching operations (step 680). Additionally or alternatively, both pieces of information may be fed into the machine learning process, where they may be compared to other signatures in the database, whether authentic or synthetic, in order to further optimize one or more sets of signature weights.

The operations depicted in FIG. 6 describe an application of the invention to a situation in which a database of signatures and a set of optimal weights may be used to determine the identification information of a license plate image for which such identification information was not previously known. In some embodiments, the invention may also be used to analyze previously captured images of license plates using only known identification information associated with a particular license plate or vehicle.

For example, each time a new license plate image is captured, a signature of the captured image may be computed and stored into an "historical" database or database table. The historical database may further include metadata describing the circumstances of each image capture. For example, if an image of a license plate is captured at a certain date and time at a certain geographical location, that date, time, and location information may be stored in the database in association with the signature. Thus, the historical database, may reflect a history of image captures from which it can be determined which vehicles were detected at which times and at which locations.

Figure 7:
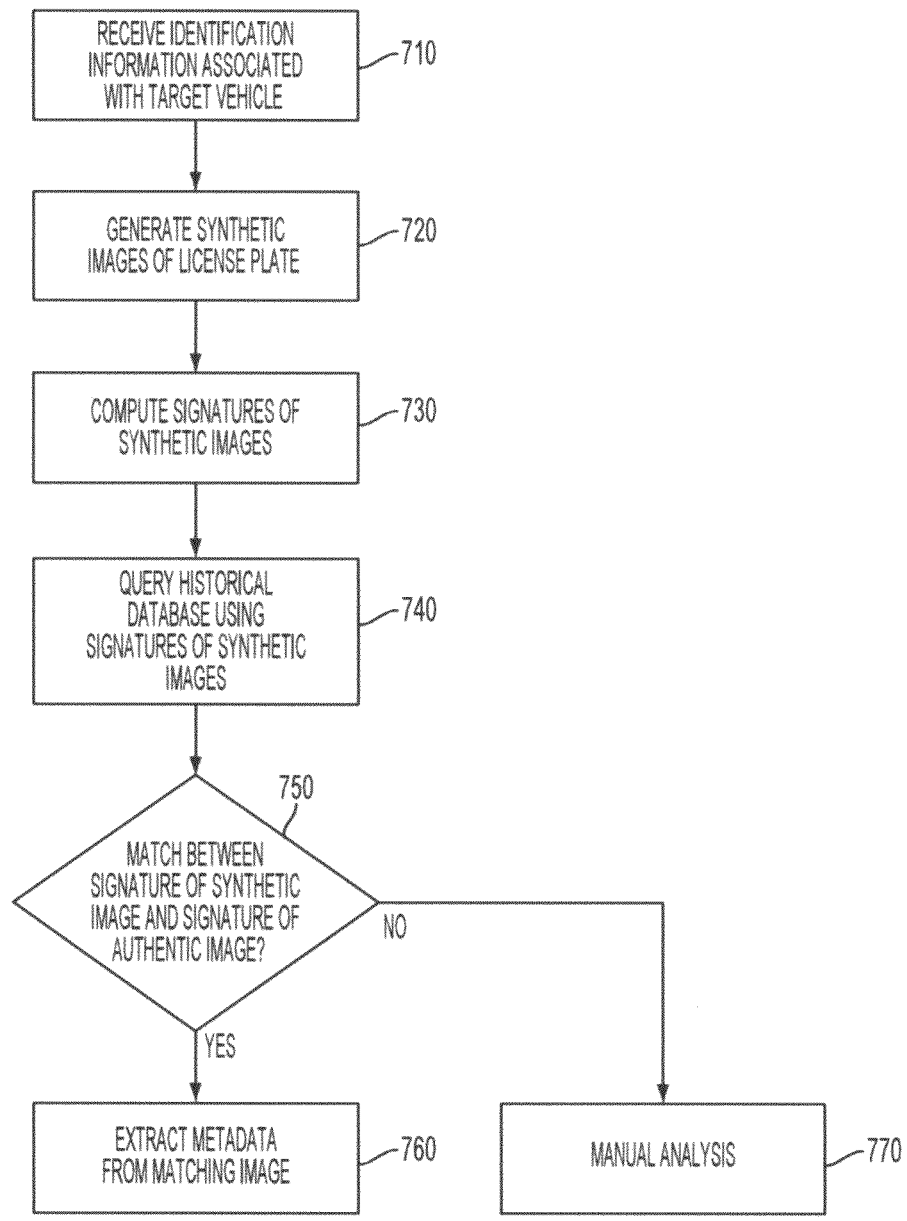
FIG. 7 is a flowchart depicting an exemplary method of identifying an authentic image of a license plate using a synthetic license plate image generated from the vehicle's license plate identification information, consistent with certain disclosed embodiments.

Importantly, the invention may be utilized to analyze this historical database without the need to first determine and store identification information for any image in the historical database. If, at any time, it is desired to know whether an image of a particular license plate is stored in the historical database, such information may be determined in accordance with the operations depicted in FIG. 7.

In step 710, identification information associated with a particular vehicle (hereinafter, "target vehicle") may be received or input into the system. For example, if law enforcement determines that a particular vehicle has been stolen, that vehicle's license plate identification information (e.g., its license plate number and issuing authority) may be entered into the system as plain alphanumeric data—i.e., rather than image data. In step 720, the system may generate one or more synthetic images of what the target vehicle's license plate might look like, e.g., based on its known license plate number, issuing authority, license plate design, etc.

The system may generate only a single synthetic image, such as an idealized image. Or, the system may generate a plurality of synthetic images by applying a variety of transformations to the idealized image using the operations described in the context of FIG. 4. By generating a plurality of synthetic images intended to mimic a variety of different environmental conditions in which a photograph of the target vehicle could have been taken or a variety of types of wear and tear on the target vehicle's license plate, the system may increase the likelihood of locating a match within the historical database.

In step 730, signatures (hereinafter "query signatures") may be computed for the one or more synthetic images (e.g., using Fisher vectors). Next, in step 740, the historical database may be queried to determine whether any signatures in the historical database match any of the query signatures to a sufficient degree. In some embodiments, such comparisons may be made using weighted signatures and/or the various efficient query techniques described above in connection with FIG. 6. Such comparisons may also be made using a low-rank asymmetric decomposition If a signature in the historical database matches one or more of the query signatures (step 750, Yes), then metadata associated with the matching image may be extracted from the historical database (step 760) and used to determine when and where the target vehicle was previously detected. In some embodiments, if the highest matching signatures in the historical database have similarity scores below a certain threshold, then the stored images associated with the matching signatures may be manually analyzed to determine whether they actually reflect the target vehicle license plate (step 770). In some embodiments, manual review may be conducted in all cases.

Thus, using this approach, a database of large numbers of previous authentic license plate image captures may be queried to determine whether a target vehicle has been previously photographed, even if identification information has not been determined for any of the image captures in the historical database. In particular, the above described synthetic image generation process may be used to generate synthetic images of a particular license plate based only on its identification information, and those signatures may be used to query an historical database of signatures associated with authentic license plate image captures. Those skilled in the art will appreciate that modifications may be made to this approach.

Although described primarily in the context of ALPR, the disclosed embodiments may be applicable to other fields or endeavors. For example, the foregoing techniques for generating synthetic images, supplying those images as inputs to a machine distance learning algorithm, and generating one or more sets of optimized weights for image signature matching may be applied to improve the OCR process itself. In some embodiments, images of characters may be synthetically generated and subjected to a variety of transformations intended to mimic how characters might appear on a page or as a result of different image scanning conditions. The optimized sets of weights resulting from such a machine distance learning process may be used to better identify authentic characters when the OCR process is used in less than ideal circumstances.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. The steps described need not be performed in the same sequence discussed or with the same degree of separation. Likewise various steps may be omitted, repeated, or combined, as necessary, to achieve the same or similar objectives or enhancements. Accordingly, the invention is not limited to the above-described embodiments, but instead is defined by the appended claims in light of their full scope of equivalents.

In the claims, unless specified otherwise, the term "license plate number" is to be construed as comprising both numeric and non-numeric characters. Also, in the claims, the term "matching" may comprise determining either an exact match between images or image signatures or the highest or best match among a plurality of comparisons.

What is claimed is:

1. A method of implementing license plate signature matching by similarity learning on synthetic images, the method comprising:
   generating a plurality of synthetic license plate images;
   selecting a plurality of image pairs comprising a first synthetic license plate image associated with known first identification information and a second license plate image associated with known second identification information;
   for each image pair in the plurality of image pairs:
      generating a first signature representing the first synthetic license plate image;
      generating a second signature representing the second license plate image;
      calculating a weighted similarity score reflecting a degree of similarity between the first signature and the second signature using a set of one or more signature weights; and
      adjusting the set of one or more signature weights to increase a likelihood that the weighted similarity score reflects a degree of similarity between the first identification information and the second identification information.

2. The method of claim 1, wherein the second license plate image is a synthetic license plate image.

3. The method of claim 1, wherein generating the plurality of synthetic license plate images comprises:
   retrieving a blank license plate template;
   retrieving a plurality of sequences of license plate characters to be rendered onto the template;
   obtaining character font, size, and color characteristics associated with the template; and
   rendering each sequence of characters onto the template in conformance with the obtained character font, size, and color characteristics.

4. The method of claim 3 wherein one or more of the character font, size, and color characteristics are derived by analysis of authentic license plate images having the template.

5. The method of claim 1, wherein generating the plurality of synthetic license plate images comprises:
applying one or more transformations to one or more synthetic license plate images to cause the one or more synthetic license plate images to resemble one or more authentic license plate image captures.

6. The method of claim 1, wherein one or more of the first signature and the second signature is a Fisher vector.

7. The method of claim 1, wherein one or more of the first identification information and the second identification information comprises a license plate number.

8. The method of claim 7, wherein the one or more of the first identification information and the second identification information further comprises an issuing authority.

9. The method of claim 1, further comprising:
receiving an authentic license plate image;
calculating a signature of the authentic license plate image;
locating a matching synthetic license plate image from among the plurality of synthetic license plate images by comparing the signature of the authentic license plate image to signatures of one or more of the plurality of synthetic license plate images using the adjusted set of one or more signature weights; and
determining identification information associated with the authentic license plate image by extracting known identification information associated with the matching synthetic license plate image.

10. A method of identifying metadata associated with a target vehicle, the method comprising:
receiving identification information associated with a target vehicle;
generating a synthetic license plate image using the identification information;
calculating a signature of the synthetic license plate image;
locating a matching authentic license plate image by matching the signature of the authentic license plate image to the signature of the synthetic license plate image; and
extracting metadata associated with the authentic license plate image.

11. The method of claim 10, wherein generating the synthetic license plate image comprises:
applying one or more transformations to the synthetic license plate image to cause the synthetic license plate image to resemble an authentic license plate image.

12. The method of claim 10, wherein the metadata comprises a time when the authentic license plate image was captured.

13. The method of claim 10, wherein the metadata comprises a place where the authentic license plate image was captured.

14. A system configured to implement license plate signature matching by similarity learning on synthetic images, the system comprising:
a processing system comprising one or more processors; and
a memory system comprising one or more computer-readable media, wherein the computer-readable media contain instructions stored thereon that, when executed by the processing system, cause the processing system to perform operations comprising:
generating a plurality of synthetic license plate images;
selecting a plurality of image pairs comprising a first synthetic license plate image associated with known first identification information and a second license plate image associated with known second identification information;
for each image pair in the plurality of image pairs:
generating a first signature representing the first synthetic license plate image;
generating a second signature representing the second license plate image;
calculating a weighted similarity score reflecting a degree of similarity between the first signature and the second signature using a set of one or more signature weights; and
adjusting the set of one or more signature weights to increase a likelihood that the weighted similarity score reflects a degree between the first identification information and the second identification information.

15. The system of claim 14, wherein the second license plate image is a synthetic license plate image.

16. The system of claim 14, wherein generating the plurality of synthetic license plate images comprises:
retrieving a blank license plate template;
retrieving a plurality of sequences of license plate characters to be rendered onto the template;
obtaining character font, size, and color characteristics associated with the template; and
rendering each sequence of characters onto the template in conformance with the obtained character font, size, and color characteristics.

17. The system of claim 16, wherein one or more of the character font, size, and color characteristics are derived by analysis of authentic license plate images having the template.

18. The system of claim 14, wherein generating the plurality of synthetic license plate images comprises:
applying one or more transformations to one or more synthetic license plate images to cause the one or more synthetic license plate images to resemble one or more authentic, license plate image captures.

19. The system of claim 14, wherein one or more of the first signature and the second signature is a Fisher vector.

20. The system of claim 14, wherein one or more of the first identification information and the second identification information comprises a license plate number.

21. The system of claim 20, wherein the one or more of the first identification information and the second identification information further comprises an issuing authority.

22. The system of claim 14, the operations further comprising:
receiving an authentic license plate image;
calculating a signature of the authentic license plate image;
locating a matching license plate image from among the plurality of license plate images by comparing the signature of the authentic license plate image to signatures of one or more of the plurality of synthetic license plate images using the adjusted set of one or more signature weights; and
determining identification information associated with the authentic license plate image by extracting known identification information associated with the matching synthetic license plate image.

23. A system configured to identify metadata associated with a target vehicle, the system comprising:
- a processing system comprising one or more processors; and
- a memory system comprising one or more computer-readable media, wherein the computer-readable media contain instructions stored thereon that, when executed by the processing system, cause the processing system to perform operations comprising:
  - receiving identification information associated with a target vehicle;
  - generating a synthetic license plate image using the identification information;
  - calculating a signature of the synthetic license plate image;
  - locating a matching authentic license plate image by matching the signature of the authentic license plate image to the signature of the synthetic license plate image; and
  - extracting metadata associated with the authentic license plate image.

24. The system of claim 23, wherein generating the synthetic license plate image comprises:
- applying one or more transformations to the synthetic license plate image to cause the synthetic license plate image to resemble an authentic license plate image.

25. The system of claim 23, wherein the metadata comprises one of a time when and a place where the authentic license plate image was captured.

* * * * *